United States Patent
Schad et al.

(10) Patent No.: US 8,974,716 B2
(45) Date of Patent: Mar. 10, 2015

(54) INJECTION MOLDING MACHINE HAVING A TIE BAR ENGAGEMENT APPARATUS AND METHOD OF OPERATING SAME

(71) Applicant: Athena Automation Ltd., Vaughan (CA)

(72) Inventors: Robert D. Schad, Toronto (CA); Carsten Link, Burlington (CA)

(73) Assignee: Athena Automation Ltd., Vaughan (CA)

( * ) Notice: Subject to any disclaimer, the term of this patent is extended or adjusted under 35 U.S.C. 154(b) by 110 days.

(21) Appl. No.: 13/855,424

(22) Filed: Apr. 2, 2013

(65) Prior Publication Data

US 2013/0256950 A1 Oct. 3, 2013

Related U.S. Application Data

(60) Provisional application No. 61/619,166, filed on Apr. 2, 2012.

(51) Int. Cl.
*B29C 33/20* (2006.01)
*B29C 45/67* (2006.01)

(52) U.S. Cl.
CPC ............. *B29C 33/20* (2013.01); *B29C 45/6728* (2013.01)
USPC ......... 264/319; 264/328.1; 425/589; 425/595

(58) Field of Classification Search
CPC ............................ B29C 33/20; B29C 45/6728
USPC ......................... 264/319, 328.1; 425/589, 595
See application file for complete search history.

(56) References Cited

U.S. PATENT DOCUMENTS

| 3,757,679 | A | * | 9/1973 | Broderick ..................... 100/343 |
| 6,120,722 | A | | 9/2000 | Schad |
| 6,250,905 | B1 | | 6/2001 | Mailliet et al. |
| 7,186,106 | B2 | | 3/2007 | Kato et al. |
| 7,461,976 | B2 | | 12/2008 | Glaesener et al. |

FOREIGN PATENT DOCUMENTS

WO 9641711 12/1996

* cited by examiner

*Primary Examiner* — Jill Heitbrink
(74) *Attorney, Agent, or Firm* — Bereskin & Parr LLP/S.E.N.C.R.L., s.r.l.

(57) ABSTRACT

An injection molding machine includes a base and an injection unit mounted to the base, and a first platen for holding a first mold section and a second platen for holding a second mold section. The first and second platens are supported by the base, and are movable along a machine axis between mold-open and mold-closed positions. At least a first tie bar engagement apparatus is associated with a first tie bar and includes a first bore in the first platen for receiving the respective tie bar therethrough at least when the platens are in the mold-closed position; and a first roller mounted to the first platen proximate the first bore. The first roller is rotatable about a first roller axis that is oriented horizontally and perpendicular to the machine axis.

18 Claims, 14 Drawing Sheets

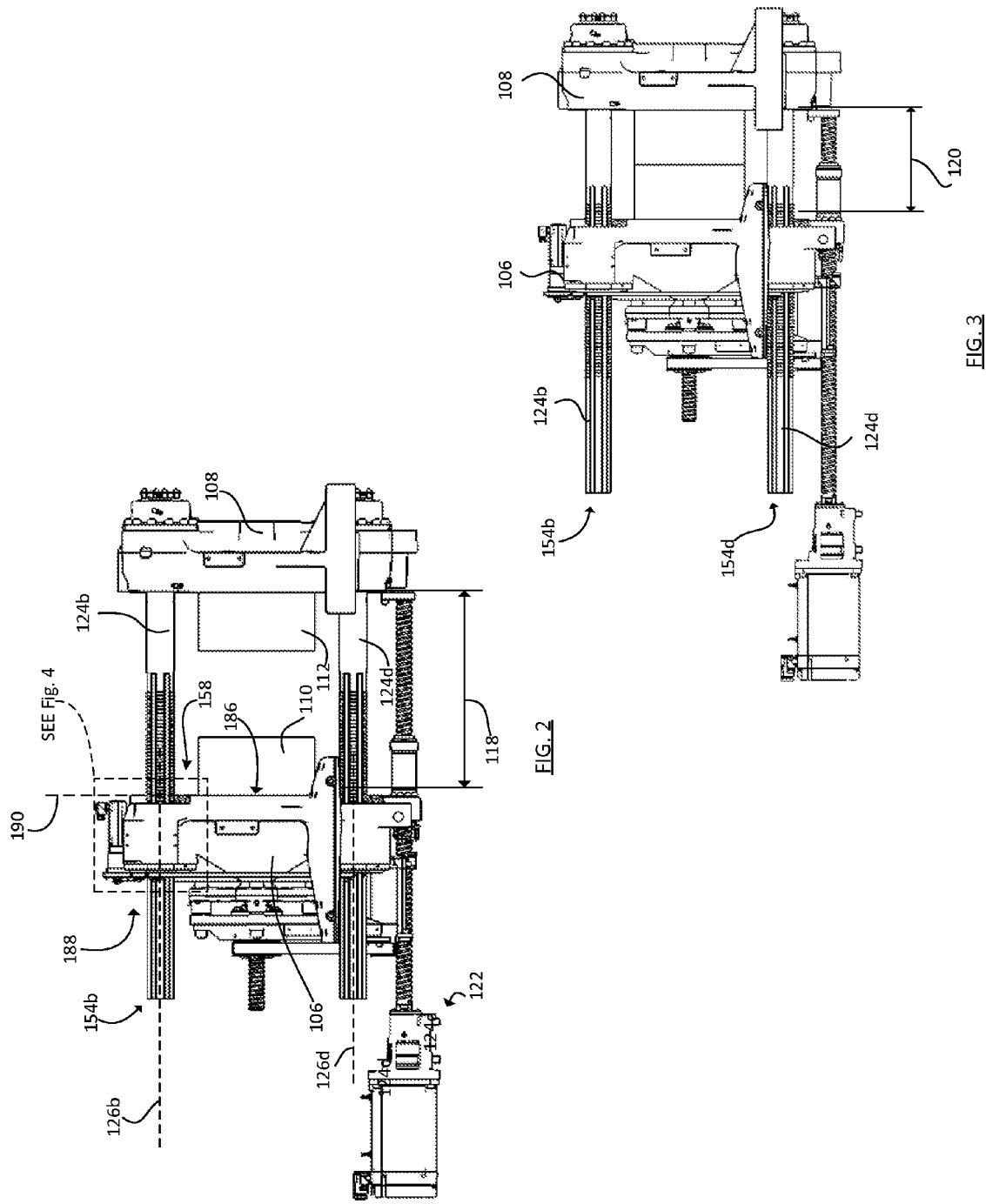

INJECTION MOLDING MACHINE HAVING A TIE BAR ENGAGEMENT APPARATUS AND METHOD OF OPERATING SAME

This application claims the benefit of Provisional Application Ser. No. 61/619,166, filed Apr. 2, 2012, which is hereby incorporated herein by reference.

FIELD

The present subject matter of the teachings described herein relates generally to injection molding machines including at least one tie bar engagement apparatus and methods of operating the same.

BACKGROUND

U.S. Pat. No. 7,461,976 (Glaesener et al.) discloses a flexible shoe assembly for use in a molding system. The clamp unit of a molding system includes a moving platen and a stationary platen supported by a frame. Tie bars interconnect the moving platen with the stationary platen. The tie bars are secured to the stationary platen and pass through respective openings in the moving platen. Each tie bar is supported and guided within their respective openings by a flexible shoe assembly and wear pad. The flexible shoe assembly has a force redirector for directing force away from a peripheral edge of the wear pad towards a central force area. The flexible shoe assembly also includes a load distributor to distribute the load across the wear pad surface. The flexible shoe assembly includes an upper support that is flexible about a lower support to keep the wear pad in operational contact with the tie bar.

U.S. Pat. No. 5,620,723 (Glaesener et al.) discloses an injection molding machine that includes a stationary platen including at least one stationary mold half and a first moveable platen. The first moveable platen is moveable relative to the stationary platen and has a second mold half adapted to engage the stationary mold half to for a first mold. A second moveable platen may also be provided which is moveable toward the stationary platen and includes a third mold half adapted to engage a fourth mold half included with one of the stationary platen and the first moveable platen. The third and fourth mold halves form a second mold. Each of the first and second molds having a hot runner leading thereto and an injection unit is provided for delivering melt to the hot runners of the first and second molds. The machine also includes tie bars extending between and connecting the stationary platen and the moveable platens. At least one of the first and, if used, the second moveable platen and stationary platen includes a mechanism for securing at least one of the tie bars. The mechanism for securing comprises an engagement mechanism for placing the mechanism for securing into and out of locking engagement with at least one of the tie bars such that when the engagement mechanism is out of locking engagement with the at least one tie bar, the mechanism for securing and the at least one tie bar are relatively moveable.

SUMMARY

The following summary is intended to introduce the reader to various aspects of the applicant's teaching, but not to define any invention. In general, disclosed herein are one or more methods or apparatuses related to injection molding, and to cooling injection molded articles outside the mold area of an injection molding machine.

According to one aspect of the teaching disclosed herein, an injection molding machine includes (a) a base and an injection unit mounted to the base; (b) a first platen for holding a first mold section and a second platen for holding a second mold section, the first and second platens supported by the base, at least one of the first and second platens coupled to a platen actuator for moving the at least one platen relative to the other along a machine axis between mold-open and mold-closed positions, the machine axis oriented horizontally and defining a longitudinal direction parallel to the machine axis; (c) at least a first tie bar extending generally between the first and second platens for coupling together the first and second platens when in the mold-closed position, the first tie bar extending in the longitudinal direction along a first tie bar axis, the first tie bar having a fixed end secured to the second platen and a free end spaced longitudinally away from the fixed end, and the first tie bar having a first bearing surface extending longitudinally along an underside surface of the tie bar; and (d) at least a first tie bar engagement apparatus associated with the first tie bar.

The first tie bar engagement apparatus includes: a first bore in the first platen for receiving the respective tie bar therethrough at least when the platens are in the mold-closed position; and a first roller mounted to the first platen proximate the first bore, the first roller comprising a first peripheral surface in rolling engagement with the first tie bar when the first tie bar is received in the first bore to support the first tie bar from beneath, the first roller rotatable about a first roller axis that is oriented horizontally and perpendicular to the machine axis, the first roller axis defining a lateral direction.

In some examples, a vertical alignment plane containing the first bore axis intersects the first peripheral surface of the first roller. In some examples, the first peripheral surface may be generally cylindrical and has a lateral extent that is parallel to the first roller axis, and the lateral extent may be laterally centered about the vertical alignment plane containing the first bore axis. The first roller may exert a first support force on the first bearing surface, the first support force directed vertically upwards in lateral alignment with the first tie bar axis. The first bearing surface may be disposed in a generally horizontal bearing surface plane and the first support force exerted by the first roller may be normal to the bearing surface plane. The first peripheral surface of the first roller may provide tangential engagement with the first tie bar along a first line of engagement, the first line of engagement oriented longitudinally and in lateral alignment with the first bore axis and at a first elevation below the first bore axis.

In some examples, the first platen includes a first side facing the second platen, the first side having a first mold support surface disposed in a vertical first support surface plane that is orthogonal to the machine axis, and the first roller may be set back longitudinally from the support surface plane away from the second platen such that the first peripheral surface is longitudinally shy of the first support surface plane. The first bore may have a first end directed towards the second platen, the first end set longitudinally back from the first support surface plane, and the first roller axis may be longitudinally intermediate the first end of the first bore and the first support surface plane. The first peripheral surface of the first roller may have a first roller radius, and the first roller axis may be set back longitudinally from the first support surface plane by a longitudinal offset that is greater than the first roller radius.

In some examples, the first tie bar may have a plurality of outwardly protruding tie bar teeth spaced apart longitudinally along at least a portion of the first tie bar, and the first tie bar engagement apparatus may include a locking member adjacent the first bore, the locking member having inwardly directed locking teeth, the locking member moveable between a locked position in which the locking teeth engage the tie bar teeth to restrict longitudinal movement of the first tie bar relative to the first platen, and an unlocked position in which the locking teeth and tie bar teeth are disengaged and longitudinal movement of the first tie bar relative to the first platen is unrestricted by the locking member. The first bearing surface may include a first track surface on the first tie bar, the first track surface having first and second lateral sides extending longitudinally along the tie bar, the first and second lateral sides at least partially bounded by portions of the tie bar teeth extending circumferentially away from either side of the first track surface. The first lateral side of the first track surface may be at least partially bounded by a first longitudinal row of teeth and the second lateral side of the first track surface may be at least partially bounded by a second longitudinal row of teeth. The track surface may be integral with the first tie bar.

In some examples, the tie bar engagement apparatus may include a second roller mounted to the first platen proximate the first bore, the second roller having a second peripheral surface for tangential engagement with the first tie bar along a second line of engagement disposed laterally away from the first bore axis and at a second elevation above the first bore axis, the second peripheral surface in rolling engagement with the first tie bar when the first tie bar is received in the first bore to exert a first laterally inward alignment force and first vertically downward alignment force on the tie bar. The tie bar engagement apparatus may further include a third roller mounted to the first platen proximate the first bore, the third roller having a third peripheral surface for tangential engagement with the first tie bar along a third line of engagement disposed laterally away from the first bore axis opposite the second line of engagement and at an elevation above the first bore axis and generally equal to the second elevation, the third peripheral surface in rolling engagement with the first tie bar when the first tie bar is received in the first bore to exert a second laterally inward alignment force and a second vertically downward alignment force on the tie bar, the second laterally inward alignment force opposite the first laterally inward alignment force. The first roller, second roller and third roller may be equally spaced apart from each other about the periphery of the first bore.

According to some aspects, a platen for an injection molding machine includes: (a) a first bore in the first platen for receiving a respective tie bar therethrough, the first bore extending along a first bore axis; and (b) a first roller mounted to the first platen proximate the first bore, the first roller having a first peripheral surface for bearing against the tie bar in rolling engagement when the first tie bar is received in the first bore to support the first tie bar from beneath, the first roller rotatable about a first roller axis that is oriented horizontally and perpendicular to the first bore axis, the first roller exerting a first support force on the tie bar, the first support force directed vertically upwards in lateral alignment with the first bore axis.

According to some aspects, a method of supporting a plurality of tie bars on an injection molding machine having a pair of platens and a plurality of tie bars extending between the platens includes: (a) translating the tie bars through respective bores in a first one of the platens while moving at least one of the platens relative to the other between mold-open and mold-closed positions, each bore extending longitudinally along a bore axis; and (b) during at least a portion of the translation of step (a), supporting each tie bar from underneath with a respective roller mounted to the first platen adjacent each respective bore, each respective roller rotatable about a support roller axis that is generally horizontal and disposed vertically below, and in lateral registration with, the bore axis of each respective bore.

In some examples, each tie bar has a fixed end secured to the second platen and a free end spaced apart from the fixed end, and the step of translating the platens to the mold open position includes withdrawing the tie bars from the bores of the first platen. In some examples, translating the platens from the mold-open position towards the mold-closed position includes moving the free end of each respective tie bar from a roller-disengaged position in which the free end of the tie bar is below vertical alignment with the respective bore, into a roller-engaged position in which the free end of the tie bar is raised into vertical alignment with the respective bore by engagement with the respective roller.

Other aspects and features of the present specification will become apparent, to those ordinarily skilled in the art, upon review of the following description of specific examples of the teaching disclosed herein.

DRAWINGS

The drawings included herewith are for illustrating various examples of articles, methods, and apparatuses of the teaching of the present specification and are not intended to limit the scope of what is taught in any way.

In the drawings:

FIG. 2 is a side view of a portion of the injection molding machine of FIG. 1 showing the moving platen in a first position;

FIG. 3 is similar to FIG. 2, showing the moving platen in a second position;

DETAILED DESCRIPTION

Various apparatuses or processes will be described below to provide an example of an embodiment of each claimed invention. No embodiment described below limits any claimed invention and any claimed invention may cover processes or apparatuses that differ from those described below. The claimed inventions are not limited to apparatuses or processes having all of the features of any one apparatus or process described below or to features common to multiple or all of the apparatuses described below. It is possible that an apparatus or process described below is not an embodiment of any claimed invention. Any invention disclosed in an apparatus or process described below that is not claimed in this document may be the subject matter of another protective instrument, for example, a continuing patent application, and the applicants, inventors or owners do not intend to abandon, disclaim or dedicate to the public any such invention by its disclosure in this document.

Figure 1:
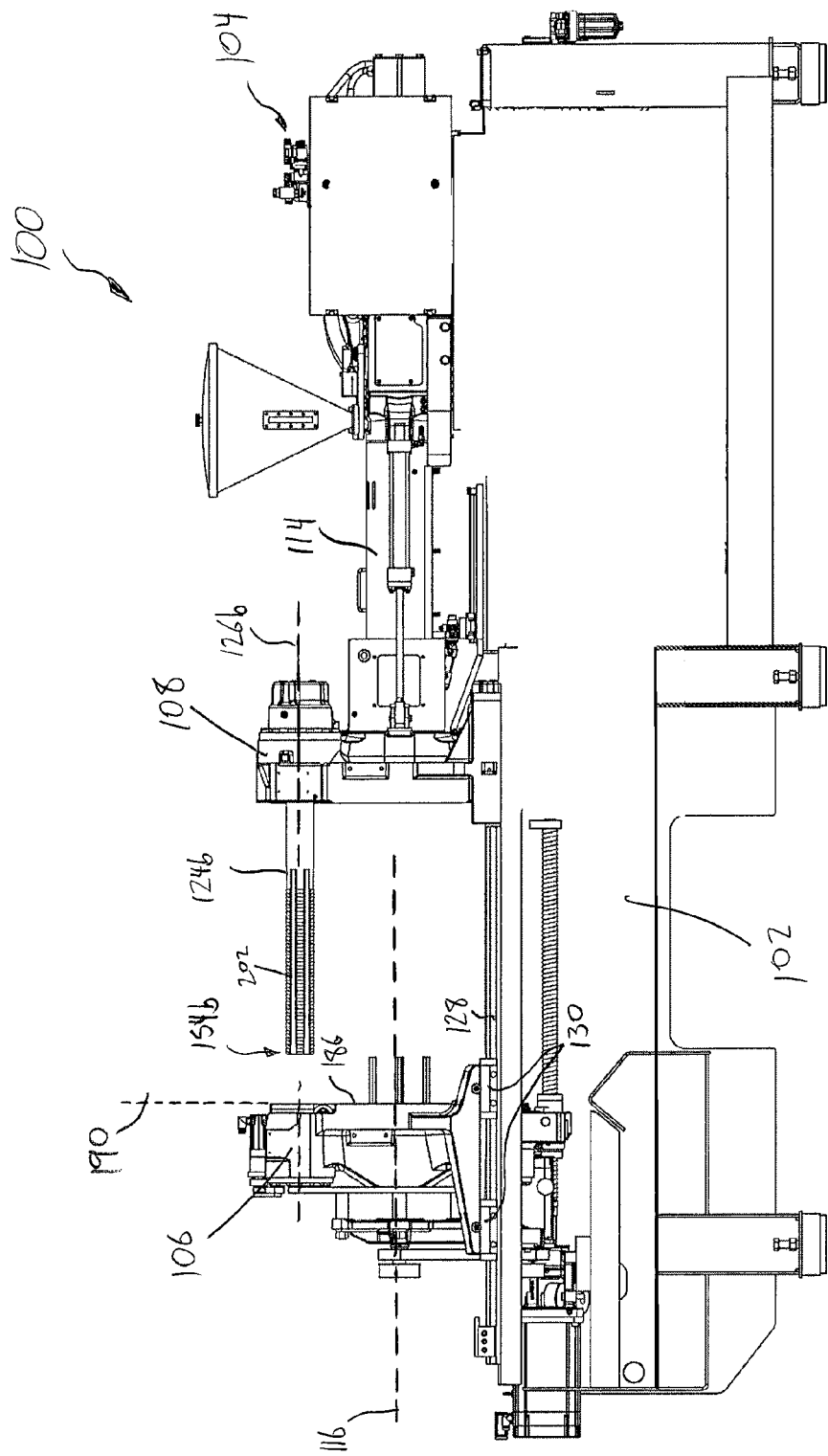
FIG. 1 is a side view of an example of an injection molding machine.

Referring to FIG. 1, an example of an injection molding machine 100 includes a base 102, an injection unit 104 mounted on the base 102 and a first platen 106 and a second platen 108. The first and second platens 106, 108 are mounted to the base 102 and are configured to support respective first and second mold portions 110 and 112 (see FIG. 2). The first and second mold portions 110 and 112 can be closed together to provide a mold for forming molded articles, and the injection unit 104 includes a barrel 114 for delivering molten plastic into the mold. When the molten plastic has sufficiently hardened the first and second mold portions 110 and 112 can be separated and the molded articles can be removed from the mold.

In the example illustrated, the injection molding machine 100 is a two-platen type injection molding machine. In this configuration, the first platen 106 is a moving platen that can slide or translate in an axial direction along the base (i.e. in the direction of the machine axis 116), towards and away from the second platen 108, which is stationary in the example illustrated. The machine axis 116 is horizontal in the example illustrated, and defines a longitudinal direction.

Referring to FIG. 2, the first platen 106 can be moved to an open position, in which the first platen 106 is spaced apart from the second platen 108 by a first distance 118 and the first and second mold portions 110 and 112 are axially spaced apart from each other. Referring to FIG. 3, the first platen 106 can also be moved to a closed position, in which the first platen 106 is spaced apart from the second platen 108 by a smaller, second distance 120 and the first and second mold portions 110 and 112 are in contact with each other.

Any suitable platen actuator or apparatus can be used to axially translate the first platen 106 relative to the second platen 108. In the illustrated example, a platen actuator 122, including a motor and ball screw, is provided to facilitate moving the first platen 106 between open and closed positions relative to the stationary platen 108 during each molding cycle carried out by the injection molding machine.

Figure 5:
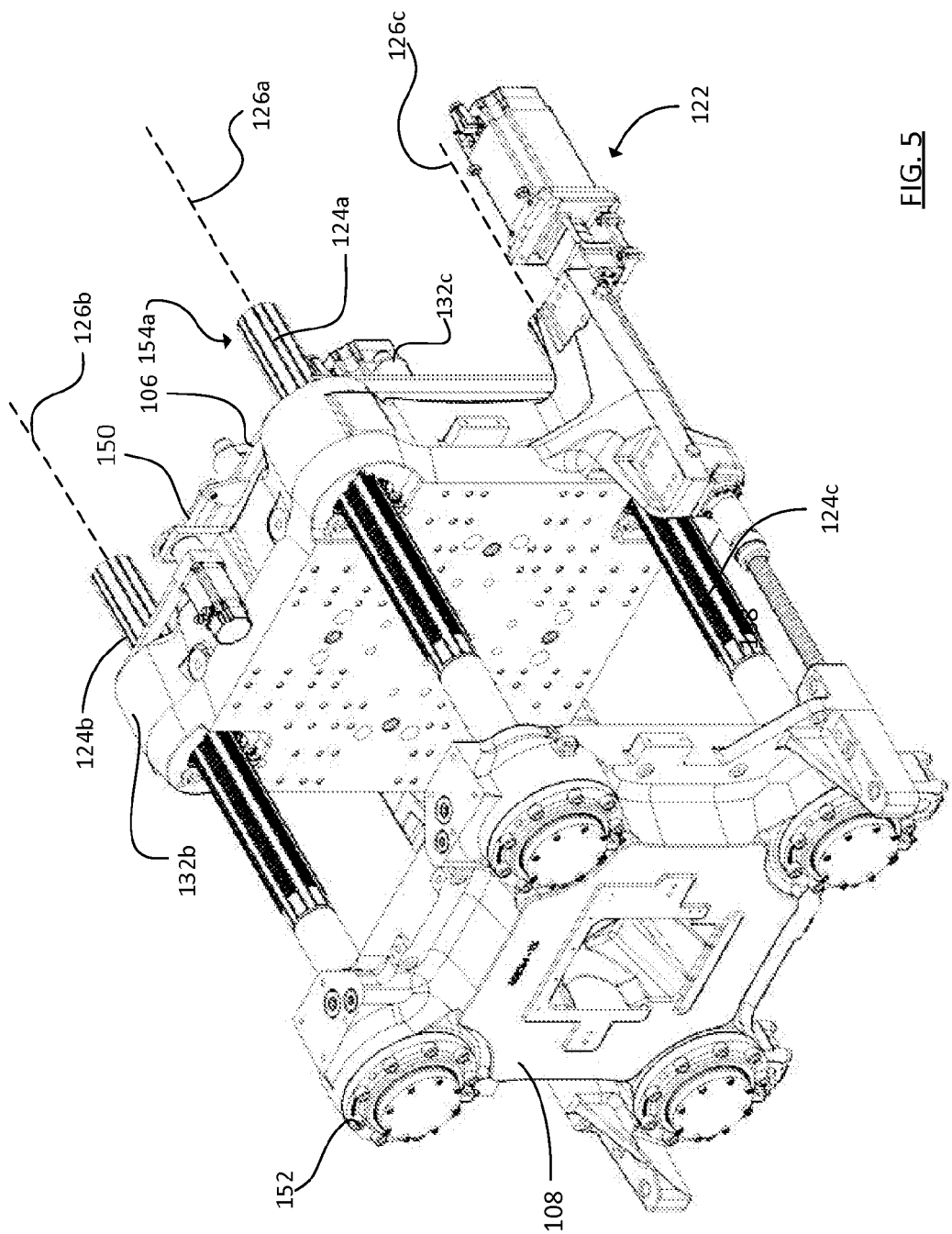
FIG. 5 is a rear perspective view of a portion of the injection molding machine of FIG. 1.

One or more connecting members can extend between the first and second platens 106 and 108 for coupling together the first and second platens when in the mold-closed position. Referring to FIG. 5, in the illustrated example, the connecting members include a plurality of tie bars 124, including tie bars 124a, 124b, 124c and 124d, that extend between the first and second platens 106 and 108 for exerting a clamping force across the mold to hold the mold in the closed position during an injection cycle. The tie bars 124 each extend along a respective tie bar axis 126 that is parallel to and offset from the machine axis 116 (see FIG. 1).

The first platen 106 may be slidingly supported on any suitable apparatus, including, for example a rail 128 on the injection molding machine 100. Referring to FIG. 1, in the example shown, the first platen 106 is slidingly supported on rails 128 by runners 130, and is movable between open and closed positions (the open position is shown in FIG. 2 and the closed position is shown in FIG. 3). In the example illustrated, as the first platen 106 moves along the rails 128, it moves relative to the tie bars 124 and the second platen 108.

Figure 6:
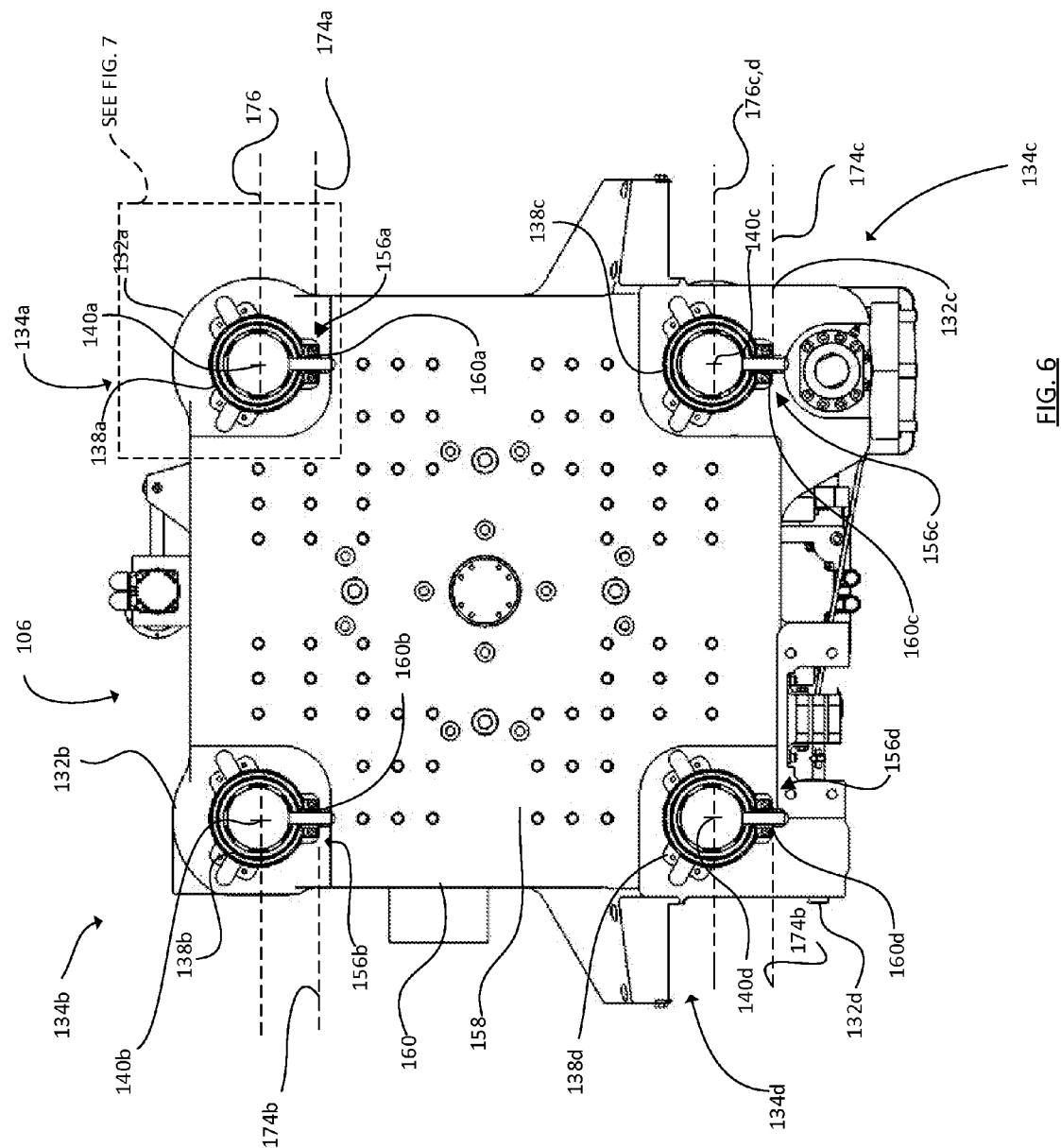
FIG. 6 is a front view of a moving platen.

Referring to FIG. 6, in the illustrated example, the tie bars 124 are connected to, and extend from, the second platen 108.

The machine 100 may further include a tie bar engagement apparatus associated with each tie bar. Each tie bar engagement apparatus can include a respective bore in the first platen 106 for receiving the corresponding tie bar therethrough, and a support member such as a roller 160 mounted to the first platen proximate the respective bore for supporting the tie bar from beneath when received in the bore.

In the example illustrated, the first platen 106 includes a plurality of tie bar connection bosses 132, including bosses 132a, 132b, 132c and 132d, located at respective corners 134a-134d of the first platen 106. Each tie bar connection boss 132a-134d includes a respective bore 138a-138d passing therethrough and extending along a bore axis 140a-140d, from an inner end 142a-142d (disposed toward the second platen 108) to an outer end 144a-144d that is longitudinally spaced apart from the inner end (see also FIG. 4). The axial distance 146 between the inner end 142 and the outer end 144 defines a bore length. In the illustrated example, each bore axis 140a-140d is parallel to and offset from the machine axis 116, and the bore axes 140a-d are parallel with each other.

Each bore 138 is sized and shaped to slidingly receive a corresponding tie bar 124. In the illustrated example, the tie bars 124 have generally circular cross-sectional areas and each bore 138 is configured as a generally cylindrical passage extending through the first platen 106. Alternatively, the tie bar connection bosses 132 and/or bores 138 may be of any suitable configuration that can accommodate a respective tie bar shape, and may be positioned at any suitable location on the first platen 106.

In other examples, the tie bars 124 can be fixed to, and moveable with, the moving platen 106, and can be slidingly received within corresponding bosses and bores (having some or all of the features described herein) provided on the stationary platen.

Referring to FIG. 5, a locking device 150 is, in the example illustrated, affixed to the first platen 106 for releasably locking the first platen 106 to at least one of the tie bars 124. A clamping apparatus 152 is provided for exerting a clamping force across the mold portions during an injection cycle, via the tie bars. In the example illustrated, the clamping apparatuses 152 include a cylinder housing affixed to the second platen 108, and a piston (not shown) affixed to at least one of the tie bars 124 and slidable within the cylinder housing to exert a clamping force on the first and second platens 106 and 108.

Referring to FIG. 1, in the illustrated example, the tie bars 124 are primarily supported by the second platen 108, each tie bar having a fixed end secured to the second platen 108 and a free end spaced longitudinally apart from the fixed end. The tie bars may extend in a cantilevered configuration from the second platen 108. To help provide sufficient strength to withstand the clamping forces of the injection molding machine (which in some configurations may be between 50 and 350 tons, or more than 350 tons), the tie bars 124 may be formed from any suitable material having the desired mechanical properties, and typically are relatively heavy. Without sufficient support, the tie bars 124 may tend to sag or deflect under their own weight. Such deflection may interfere with operation of the injection molding machine 100. For example, operation of the machine may be compromised if the amount of deflection is such that the tie bar axes 126 are no longer parallel with the machine axis, and/or if portions of the tie bars, such as, for example the free ends of the tie bars, move out of a desired position or alignment relative to other components of the injection molding machine. Such deflection may cause interference between the tie bars and their respective bores.

To help support at least some of the weight of the tie bars 124, tie bar engagement apparatuses can include support members. Optionally, the tie bar support members can be mounted to the first platen 106 and can be movable with the first platen 106. In this configuration, at least some of the weight of the tie bars 124 can be transferred to the first platen 106 via the tie bar support members, and in turn to the machine base 102 via the first platen 106.

Optionally, the tie bar engagement apparatuses can be configured to remain engaged with the tie bars 124 throughout a complete molding cycle of the injection molding machine. For example, the rollers 160 can be in contact with the tie bars 124 when the first platen 106 is in the closed position (FIG. 3), while the clamping force is being exerted by the tie bars 124, when the first platen 106 is in the open position (FIG. 2) and/or while the first platen 106 is moving between the open and closed positions. Alternatively, the tie bar engagement apparatuses may be disengaged from the tie bars for at least some of the molding cycle. For example, the tie bar engagement apparatuses may be disengaged from the tie bars 124 while the clamping force is being exerted by the tie bars 124.

In configurations where the tie bar engagement apparatuses remain engaged while the first platen 106 is moved relative to the tie bars, it may be desirable to reduce the friction between the tie bars 124 and the tie bar engagement apparatuses. This may help reduce wear and/or resistance when the first platen 106 is moved relative to the tie bars. Optionally, the tie bar engagement apparatuses may include one or more wheel, roller or other type of rotatable apparatus that can be in rolling contact with the tie bars, instead of engaging the tie bars in sliding contact during axial movement of the first platen. The use of a rotary support member may help reduce wear of contact surfaces of the tie bar and/or tie bar engagement apparatus.

In some configurations, the first platen 106 may be moved to a third position that is axially outboard of the open position, as illustrated in FIG. 1. In this position, the tie bars 124 may be extracted from their corresponding bores 138, and the free ends 154 of the tie bars 124 may hang unsupported. Optionally, the tie bar engagement apparatuses can be configured to engage and align the each tie bar axis with the respective bore axis. This can include lifting the free ends 154 of the tie bars 124 to help guide the tie bars 124 into their respective bores 138 when the first platen 106 is moved from the third position toward the second platen 108 to re-engage with the tie bars 124.

In some examples, one or more of the tie bar engagement apparatuses may be configured to exert vertical and/or lateral alignment forces to help centre the tie bars within the bores. The tie bar supports can optionally be configured to exert net alignment forces on a tie bar when the tie bar axis is offset from its respective bore axis, and may be configured so that no net alignment force (for example no net lateral force) is exerted on the tie bar when the tie bar axis is co-axial with its respective bore axis.

Referring to FIG. 6, in the illustrated example the first platen 106 includes four tie bar engagement apparatuses 156a, 156b, 156c and 156d fixed to the inner side 158 of the first platen 106 (e.g. the side of the first platen 106 that faces the second plate 108).

Figure 7:
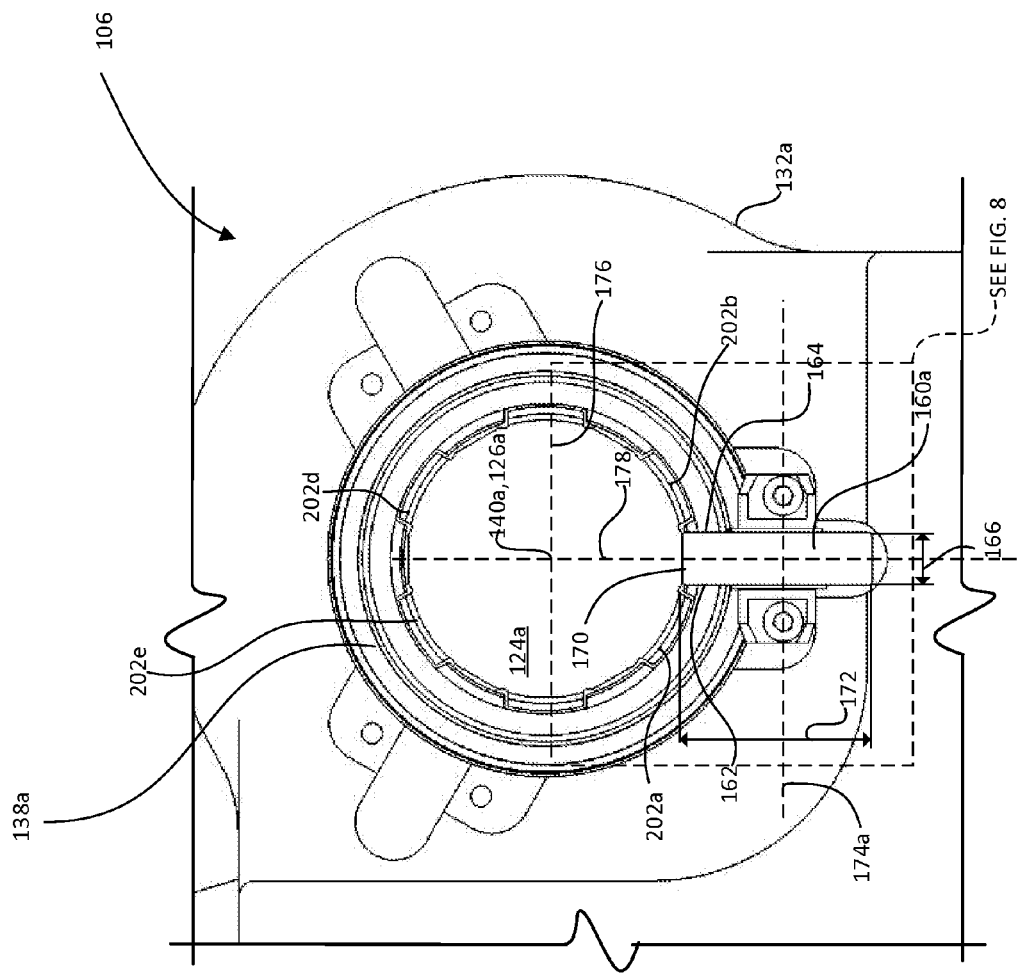
FIG. 7 is an enlarged view of a tie bar support portion of the structure of FIG. 6, including the tie bar of FIG. 5.

In the illustrated example, each tie bar engagement apparatus 156 includes a respective support roller 160a, 160b, 160c and 160d that is fixed to the first platen 106 and is positioned proximate its respective bore 138a-d to engage the underside of the tie bars 124a-d passing through the bores 138a-d. Referring to FIG. 7, the tie bar engagement apparatus 156a will be described in greater detail, but tie bar engagement apparatuses 156b-d may include identical and/or analogous features.

Referring also to FIG. 7, the tie bar engagement apparatus 156a includes a support roller 160a fixed to the first platen 106 proximate the first bore 138a. As illustrated in FIG. 7, the support roller 160a has spaced apart left and right faces 162 and 164 that are separated by a roller thickness 166. A peripheral outer surface 168 extends between the left and right faces 162 and 164. At least a portion of the peripheral surface 168 is configured to contact a complimentary bearing surface 170 on the underside of the tie bar 124a. The support roller also defines a roller diameter 172.

Optionally, the roller thickness 166 may be between about 5 mm and about 65 mm or greater, and the roller diameter 172 may be between about 10 mm and about 150 mm, or greater. Alternatively, the roller thickness 166 and/or roller diameter 172 can be any suitable size and may be selected based on a plurality of factors including, for example, the weight of the tie bars 124, the material of the roller 160a, and the size of the first platen 106.

The support roller 160a is rotatable about a roller axis 174a that extends generally parallel to and is offset below a horizontal plane 176 that extends through the bore 138a. In the illustrated example, the horizontal plane 176 contains the bore axis 140a. When the tie bar 124a is aligned within bore 138a, as illustrated, the tie bar axis 126a is co-axial with the bore axis 140a, and may also lie within the horizontal plane 176.

In the illustrated configuration, the support roller 160a is laterally centred about a vertical plane 178 containing the bore axis 140a and the vertical plane 178 passes through the downward facing bearing surface 170 of the tie bar 124a and intersects the peripheral surface 168 of the support roller 160a. In this configuration, the roller axis 174a intersects and is generally perpendicular to the vertical plane 178. Alternatively, the support roller 160a need not be laterally symmetrical about the vertical plane 178, and may be laterally offset from the geometric centre of the bore 138a and/or the tie bar 124a.

When the tie bar 124a is resting on the support roller 160a, the support roller 160a exerts a reactionary support force on the tie bar 124. The support force acts along a support force vector, illustrated in FIG. 8 using arrow 180 and has a support force magnitude, represented as the length 182 of arrow 180.

Optionally, as illustrated, the support roller 160a can be registered beneath and can be generally, laterally centred relative to the tie bar 124a. In this configuration, the support force 180 may be limited to a substantially vertical or upwardly acting force, such that the magnitude of the vertical component of the support force vector 180 equals the support force magnitude 182, and need not include any meaningful horizontal or lateral force components. Alternatively, the support roller 160a can be configured so that the support force vector 180 includes both vertical and horizontal components. Horizontal components of the support force may help guide and/or align the tie bar 124a with the bore 138a.

Referring to FIG. 6, the support rollers 160a and 160b provided proximate the upper bores 138a and 138b may be positioned so that the roller axes 174a and 174b are co-axial with each other. The support rollers 160c and 160d positioned next to lower bores 138c and 138d may be positioned so that the roller axes 174c and 174d are co-axial with each other. In this configuration, all of roller axes 174a-d are parallel with each other.

Optionally, the support rollers 160a-d, or at least the peripheral surfaces thereof, may be formed from a relatively soft material that is softer than the material used to form the first platen and/or the material used to form the tie bars 124. For example, if the tie bars are formed from metal, the support rollers may be formed from any relatively softer material including, for example, a softer metal, plastic and rubber. Forming the support rollers from a relatively soft material may allow the support rollers to function as sacrificial wear elements that may help prevent wear on the tie bar because the support rollers may tend to wear more easily than the bearing surfaces on the tie bars against which they bear. One example of a potentially suitable roller is a deep groove ball bearing, model 6306 DDU, manufactured by NSK Ltd., headquartered in Tokyo, Japan.

Referring to FIG. 2, the first platen 106 includes an inner side 158 having a mold support surface 186 to support the first mold portion 110, and an opposed outer side 188. In the illustrated example, the support rollers 160*a-d* are fixed to the inner side 158 of the first platen 106. Alternatively, the support rollers may be mounted at any other suitable location on the first platen.

Optionally, the tie bar engagement apparatuses 156 may be configured so that the longitudinally inner-most portions of the apparatuses (e.g. the portion of the tie bar engagement apparatus closest to the second platen 108) do not extend into or axially inward (longitudinally towards the second platen) beyond a mold support plane 190 containing the mold support surface 186. That is, the entirety of the tie bar engagement apparatuses 156 may be positioned longitudinally outboard of the mold support plane 190. Recessing the tie bar engagement apparatuses 156 outboard from the mold support plane 190 may help facilitate installation and removal of the mold portion 110, and may help reduce the likelihood that portions of the tie bar engagement apparatuses 156 will interfere with mold portion 110. This may help prevent damage to the tie bar engagement apparatuses 156 and/or mold portion 110 when mold portion is being installed or removed.

Figure 4:
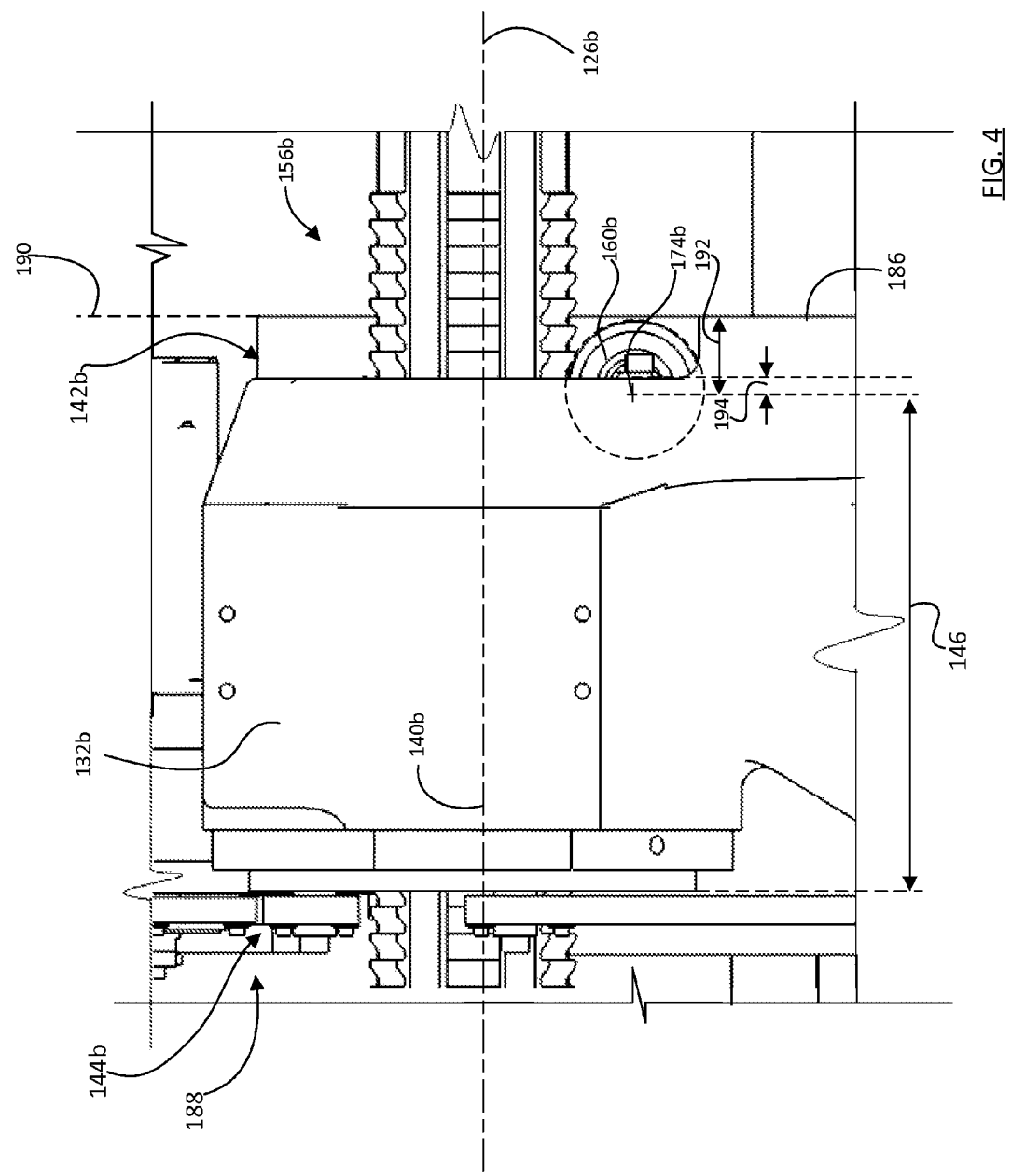
FIG. 4 is an enlarged view of a portion of the injection molding machine of FIG. 2.

Referring to FIG. 4, in the illustrated example, the tie bar engagement apparatuses 156 are positioned so that the roller axes 174, for example axis 174*b*, of the support rollers 160 are axially spaced apart (i.e. in the longitudinal direction) from the mold support plane 190 by a setback distance 192. The setback distance 192 can be any suitable distance, and optionally can be selected so that the setback distance 192 is generally equal to or greater than the radius (i.e. half the diameter 172) of the support rollers 160. In this configuration, the inner most portion of the support rollers 160 will not extend into mold support plane 190.

Optionally, as illustrated in the present example, the roller axes 174 can be spaced axially inboard from the inner ends 142 of the respective bores 138 by an offset distance 194. In this configuration, the roller axes 174 are positioned longitudinally back from the inner ends 142 (and towards the meter ends 144) of bores 138 and the mold support plane 190. Alternatively, the roller axes 174 may be positioned forward of the inner ends 142 of the bores (towards the second platen 108).

The bearing surfaces 170 on the tie bars 124 can be any suitable surface that can rollingly engage the support rollers 160. The bearing surfaces 170 may be integral with the tie bars 124, or may be provided as separate rail or track members connected to the tie bars 124. Optionally, separate track members may be replaceable or removable from the tie bars.

Optionally, the bearing surfaces 170 may be relatively smooth surfaces. Alternatively, the bearing surfaces may be relatively rough surfaces and may include a variety of surface features, including, for example a plurality of radially extending teeth. If the bearing surface includes a rough surface, such as an axially extending row of teeth, it may be desirable to select a support roller diameter that is relatively larger than a roller that is used in combination with a smooth bearing surface. Increasing the diameter of the roller may help reduce vibrations or other unwanted effects when the roller rolls over the rough bearing surface. Alternatively, or in addition, the material properties of the support rollers may be selected based on the properties and configuration of the bearing surfaces on the tie bars.

Figure 8:
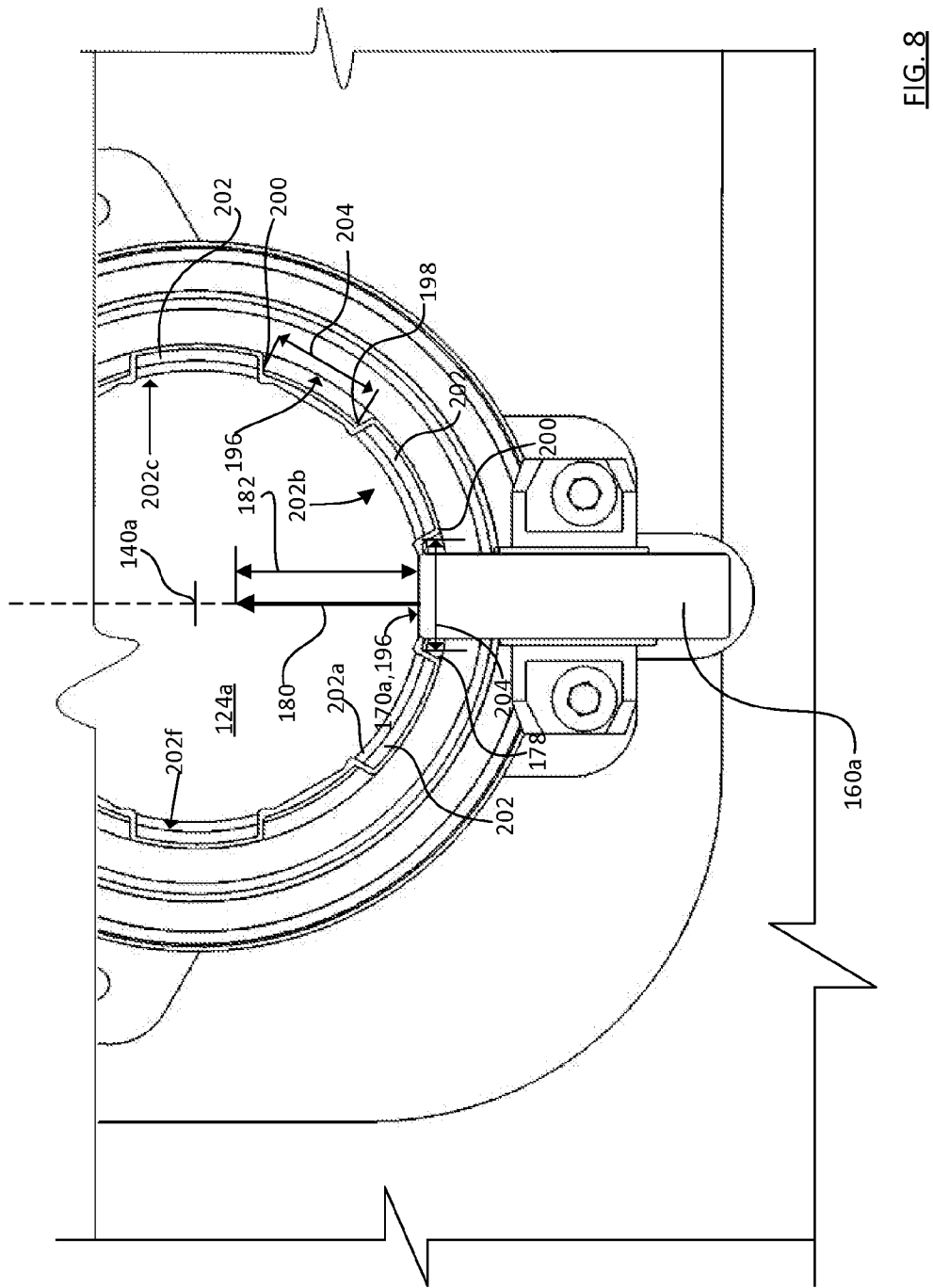
FIG. 8 is an enlarged view of a portion of FIG. 7.

Referring to FIG. 8, in the illustrated example, the bearing surface 170*a* on tie bar 124*a* is one of a plurality of axially extending track surfaces 196 provided on the tie bar 124. The bearing surface 170*a* is an integral, generally downward facing portion of the tie bar 124*a* and is configured to bear against the peripheral surface of the support roller 160*a*. In this example all of the track surfaces 196 are generally smooth, arcuate surfaces that having first and second lateral sides 198 and 200 that are at least partially bounded by a plurality of teeth 202 extending radially from the tie bar 124*a*. In the illustrated example the teeth 202 are arranged in a plurality of generally axially extending rows (six rows identified as 202*a*-202*f*; see also FIG. 7) and are configured be engaged by the tie bar locking device 150. In this configuration, the lateral width 204 of the bearing surface 170*a* (and track surfaces 196) is generally equal to the circumferential spacing between two adjacent lower rows of teeth, for example rows 202*a* and 2020*b*, on the tie bar 124.

In the illustrated example, the width 204 of the bearing surface 170*a* is greater than the width 166 of the support roller 160*a*. Alternatively, the bearing surface width 204 may be selected to be generally equal to, or less than the roller width 166.

Alternatively, the bearing surface may include the outer surfaces of an axially extending row of teeth. In some examples the tie bar 124*a* may be oriented within the bore so that the a row of teeth (e.g. row 202*a*) is centrally located at the bottom of the tie bar 124*a* (i.e. at the 6 o'clock position). In such cases, the support roller may be in rolling contact with the crests of the teeth 202 in the row 202*a* as the moving platen moves relative to the tie bar. In other examples, the teeth 202 may extend continuously around the perimeter of the tie bars 124 (e.g. there may be no track surfaces provided on the tie bar) and the support roller 160 may roll against the teeth 202.

Optionally, at least one of the bearing surfaces 170 and the support rollers 160 may be configured so that the support roller(s) 160 may exert lateral forces on the tie bars 124. For example, the bearing surface 170 may be a shaped to contact the support roller 160 so that if the tie bar 124 is misaligned with the bore 138 the support roller 160 exerts a net alignment force to urge the tie bar 124 into alignment.

Figure 9:
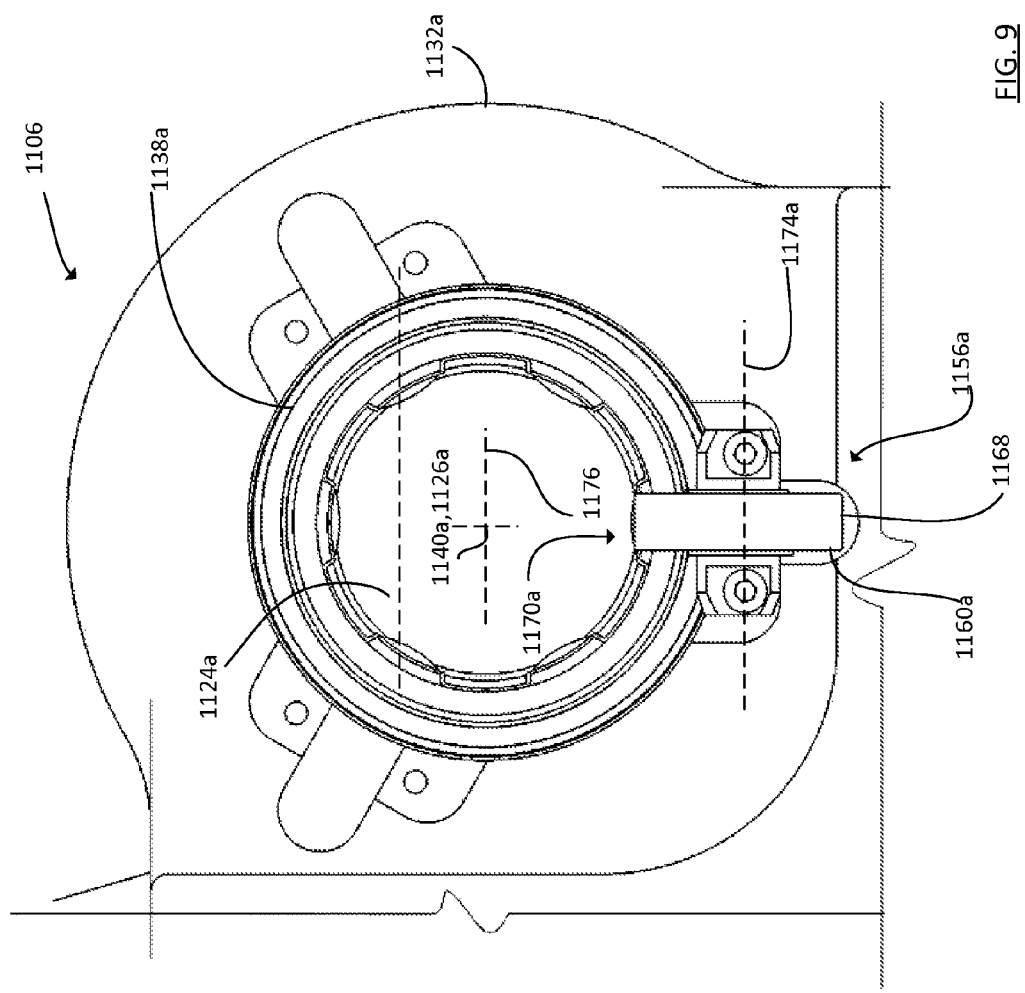
FIG. 9 is a front view of a portion of another example of a tie bar support portion, similar to that of FIG. 7.

FIG. 9 shows another example of a platen 1106, tie bar engagement apparatus 1156*a* and tie bar 1124*a* similar to platen 106, tie bar engagement apparatus 156*a* and tie bar 124*a*, with like features identified by like reference characters, incremented by 1000.

Figure 10:
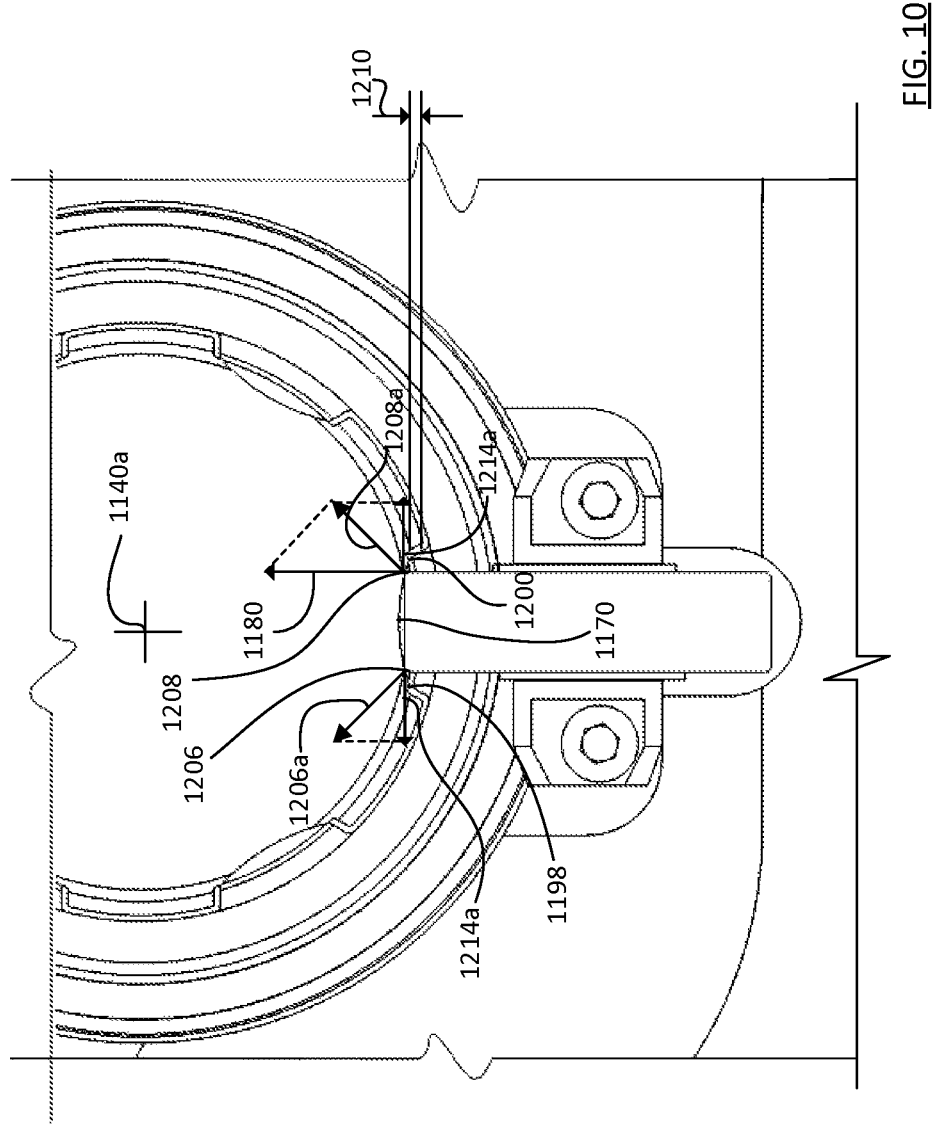
FIG. 10 is an enlarged view of a portion of FIG. 9 showing a tie bar in a first position.

The tie bar engagement apparatus 1156*a* includes a bearing surface 1170. In the illustrated example, the bearing surface 1170 is a generally concave surface that contacts the support roller 1160*a* at two discrete contact points 1206 and 1208 (FIG. 10). In the illustrated example, the contact points 1206 and 1208 are located toward the outer lateral edges of the periphery of the contact surface. In some examples, the contact points 1206 and 1208 may be provided at any other suitable location, and more than two contact points may be provided. The bearing surface 1170*a* is shaped so that the side edges 1198 and 1200 of the bearing surface spaced below the contact points 1206 and 1208 by a distance 1210.

Figure 11:
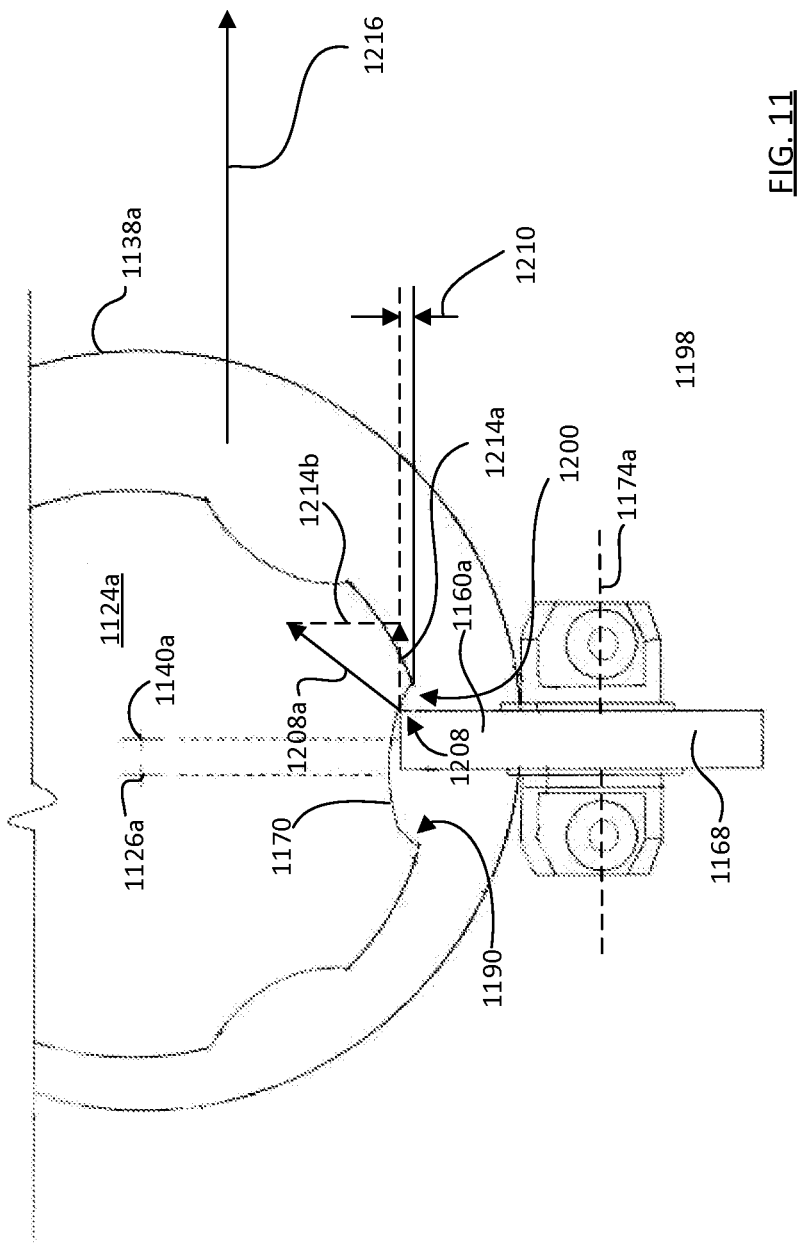
FIG. 11 is schematic representation of a portion of FIG. 10 showing a tie bar in a second position.

In this configuration, when the tie bar 1124a is aligned within the bore 1138a, as illustrated in FIG. 10, the support roller 1160a may exert only an upwardly directed support force 1180 and when the tie bar 1124a is misaligned within the bore 1138a (as illustrated in FIG. 11), the support roller 1160a may exert a net alignment force 1212 in the lateral direction to urge the tie bar into alignment.

For example, referring to FIG. 11, a schematic representation of the tie bar 1124a within bore 1138a illustrates that if the tie bar 1124a is laterally shifted to the left (such that the tie bar axis 1126a is laterally offset from the bore axis 1140a), there may only be one point of contact 1208 between the support roller 1160a and the bearing surface 1170. In the illustrated configuration, the force 1208a exerted by the support roller 1160a on the tie bar 1124a may include both horizontal and vertical components 1214a and 1214b, and the resultant force vector 1208a may urge the tie bar 1124a laterally to the right (as illustrated by arrow 1216). When the tie bar 1124a shifts to the right such that the tie bar axis 1126a is aligned with the bore axis 1140a (FIG. 10), the support roller 1160a may again contact the bearing surface 1170 at two points 1206 and 1208.

While the forces 1208a, and analogous 1206a, exerted on the bearing surface 1170 at each contact point 1206 and 1208 may each include horizontal components 1214a, the net force 1180 applied to the tie bar (the vector sum of the forces 1206a and 1208a as illustrated by showing vector 1206a in phantom at the end of vector 1208a) is an essentially vertical support force 1180 in which the magnitude of its vertical component is equal to the magnitude of the support force 1170 (e.g. there is little to no net lateral force). In this configuration, the support roller 1160a does not exert a net lateral force on the tie bar 1124a when it is centred within the bore 1138a.

Alternatively, the support roller 1160a and tie bar 1124a may have any suitable configuration that may help facilitate generation of a net alignment force when the tie bar is misaligned with the bore, and a vertical support force when the tie bar is aligned with the bore.

Optionally, a tie bar engagement apparatus may include one or more alignment members to help align, or maintain the alignment of, a tie bar within its bore. The alignment members may be separate from, and spaced apart from the support rollers. The alignment members may be configured so that they do not bear any of the weight of the tie bar, and do not exert generally upward forces on the tie bar. Optionally, the alignment members can be configured to exert generally laterally and/or generally downward acting forces on the tie bar.

The tie bar may include one or more alignment bearing surfaces configured to contact the alignment members. Optionally, the alignment bearing surfaces may be provide on the upper half of the tie bar, and may be disposed at an elevation above the horizontal plane containing the tie bar axis. The alignment members may be fixed to the platen in any suitable location from which they may contact the alignment bearing surfaces and optionally, may be positioned above the horizontal plane containing the bore axis.

Figure 12:
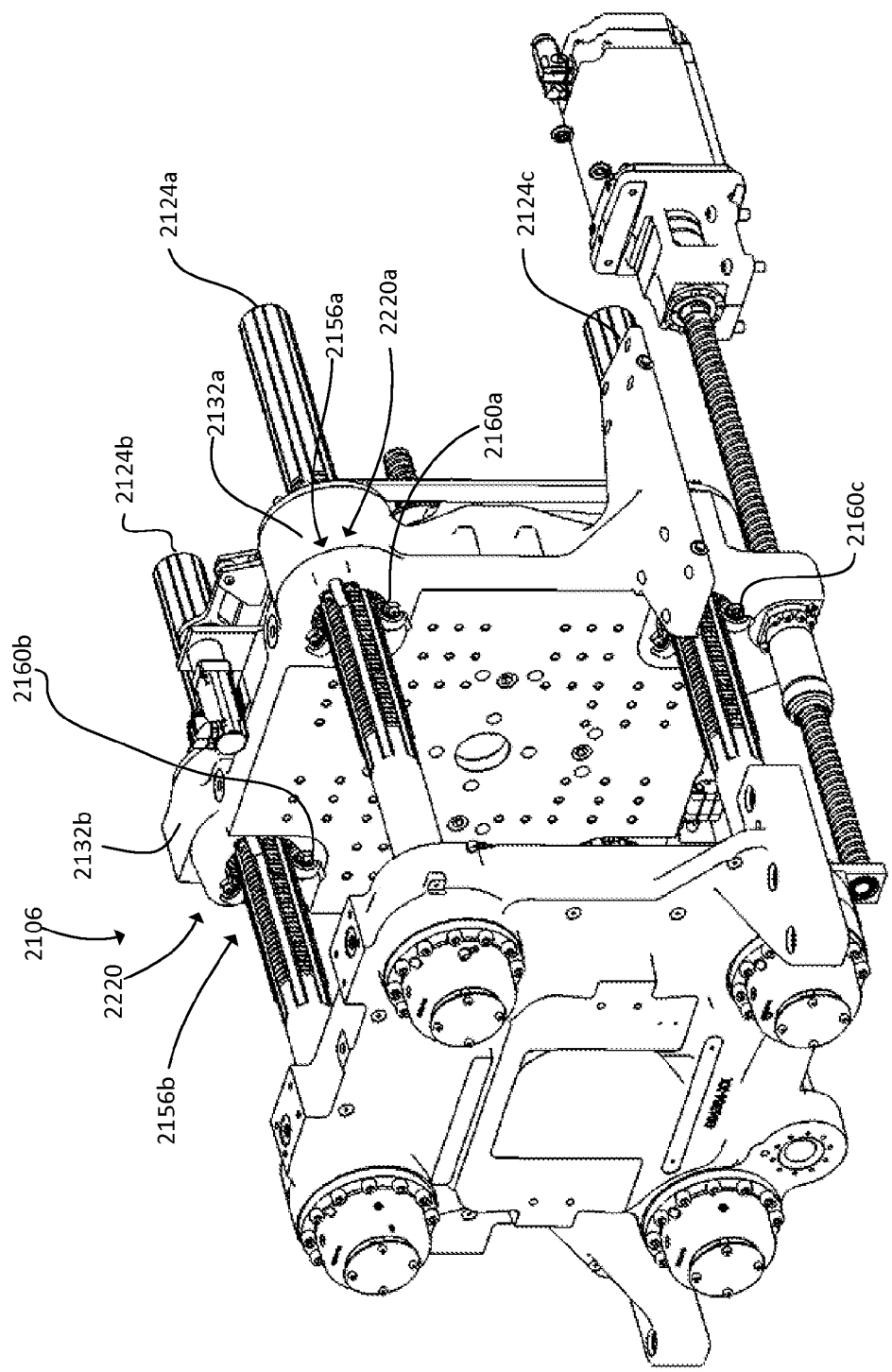
FIG. 12 is a perspective view of a portion of another example of an injection molding machine.
Figure 13:
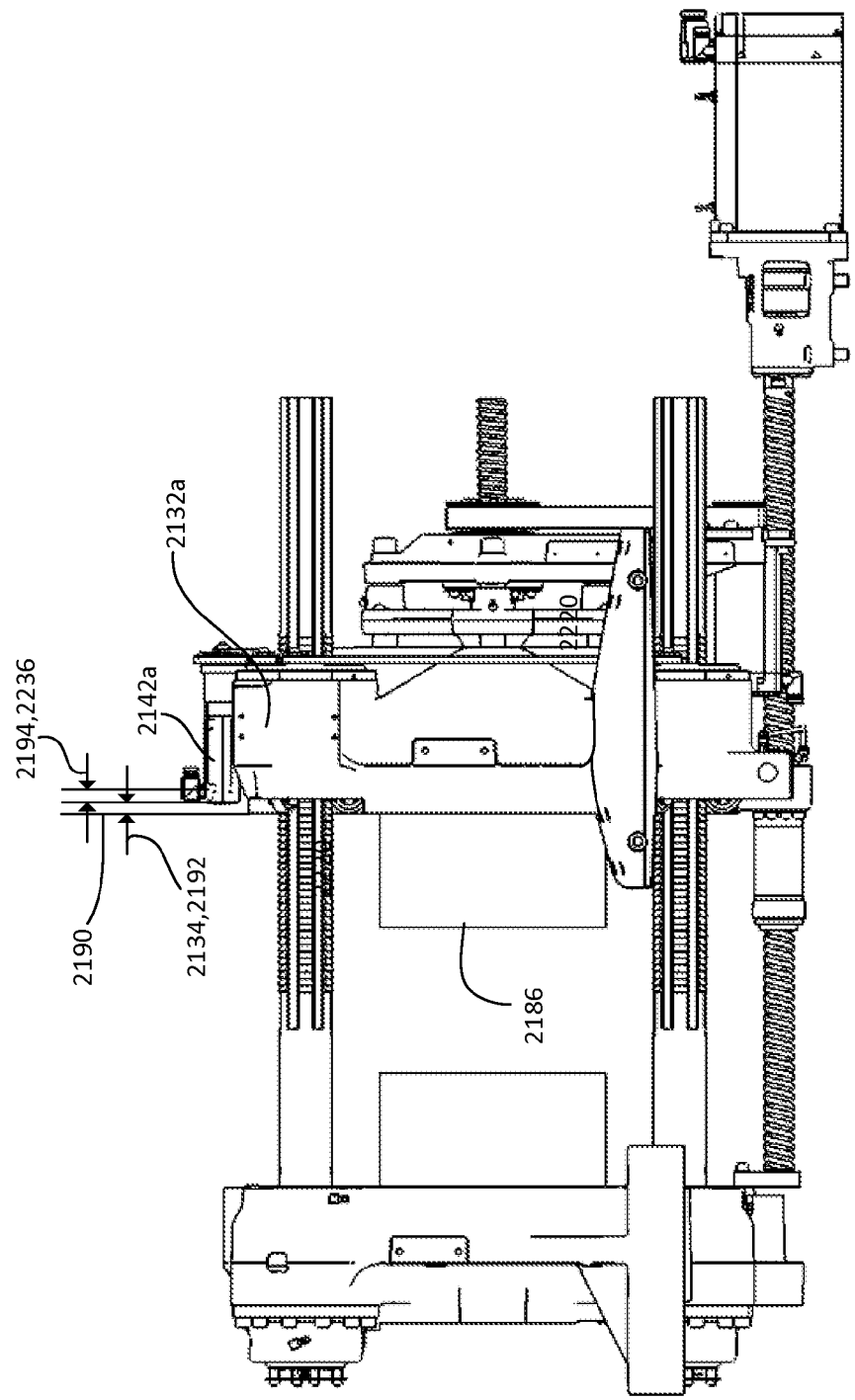
FIG. 13 is a side view of the portion of the injection molding machine of FIG. 12.
Figure 14:
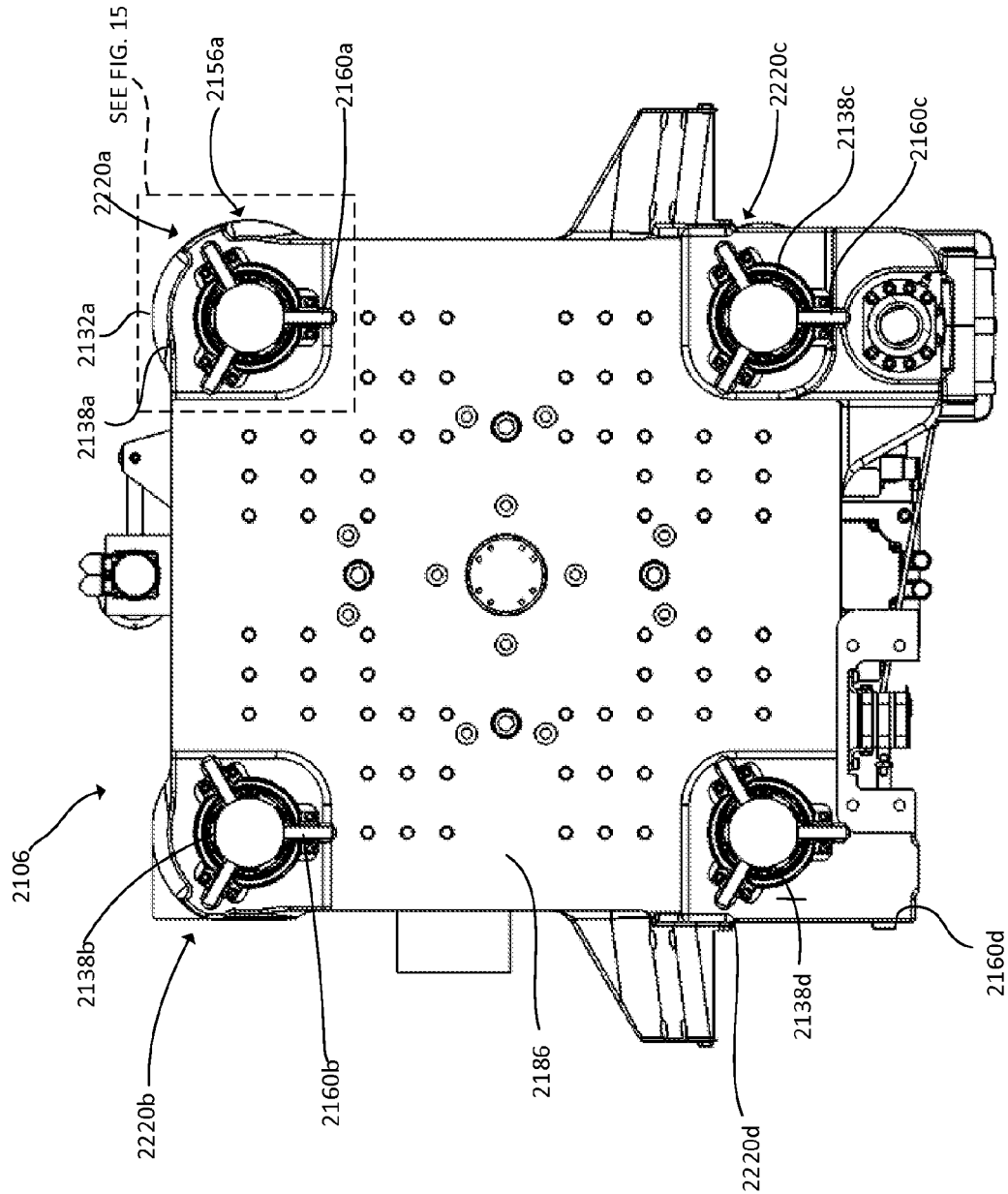
FIG. 14 is a front view of a moving platen showing the tie bar support structure of FIG. 12.

Referring to FIG. 12, tie bar engagement apparatuses 2156 are shown mounted to a first platen 2106. The tie bar engagement apparatuses 2156 include a support rollers 2160 positioned beneath respective tie bars 2124 and alignment members 2220 fixed to the platen 2106 (see also FIG. 14). The tie bar engagement apparatus 2156a, platen 2106 and tie bars 2214 may be generally similar to tie bar engagement apparatus 156, platen 106 and tie bars 124 and like features may be identified using like reference numerals indexed by 2000.

Figure 15:
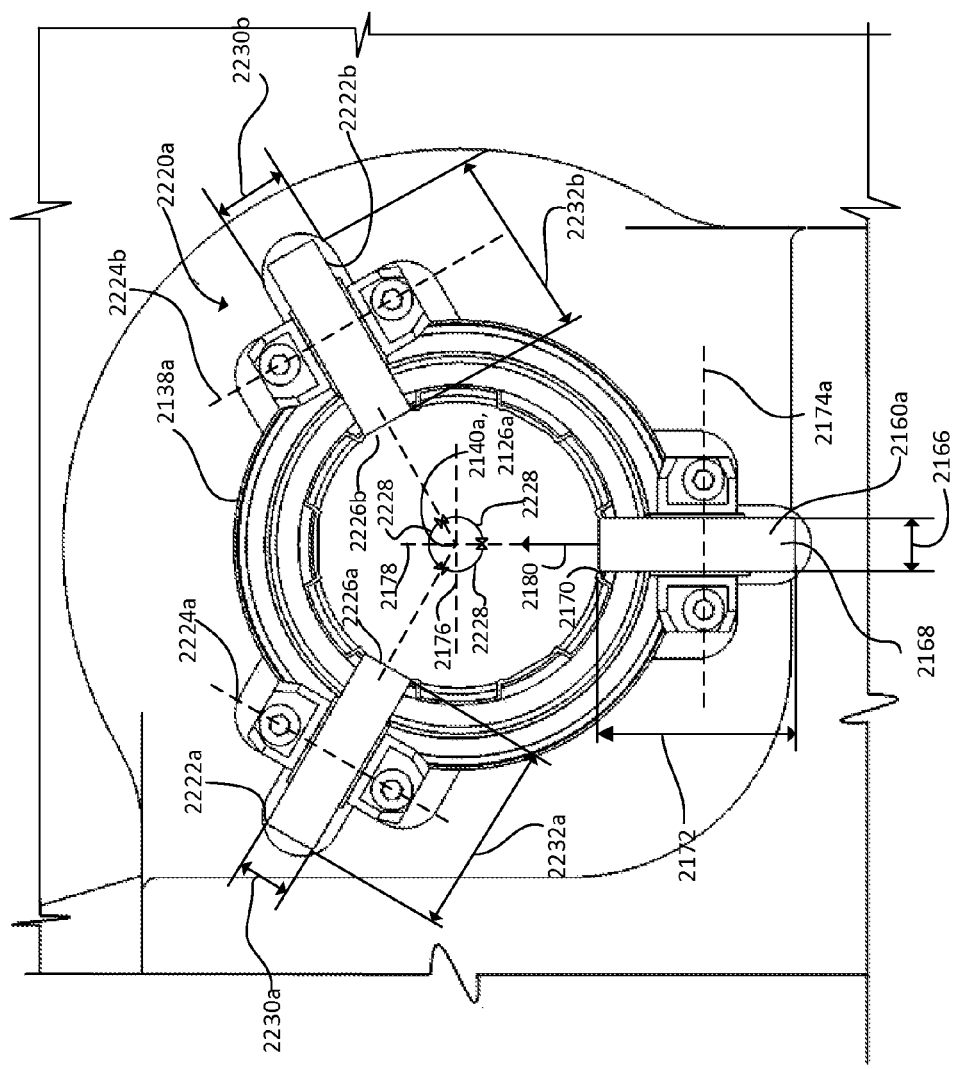
FIG. 15 is an enlarged view of a portion of FIG. 14.

Referring to FIG. 15, in the illustrated example, the alignment member 2220a includes a pair of alignment rollers 2222a and 2222b fixed to the first platen 2106. Each alignment roller 2222a and 2222b is rotatable about a respective roller axis 2224a and 2224b and is positioned to rollingly contact a corresponding alignment bearing surface 2226a and 2226b on the tie bar 2124a. Optionally, the bearing surfaces 2226a and 2226b may be smooth track surfaces that are generally identical to bearing surface 2170, or alternatively may be of any other suitable configuration.

Optionally, the alignment rollers 2222a and 2222b may be of substantially the same construction as the support roller 2160a, or alternatively, may be of different construction.

In the present example, alignment roller 2222a is provided on one side of the vertical plane 2178 containing the bore axis 2140a and of the support roller 2160a, and alignment roller 2222b is provided on the other side of the vertical plane 2178 and the support roller 2160a. In this configuration the support roller 2160a is positioned laterally between the alignment rollers 2222a and 2222b.

The alignment rollers 2222a and 2222b are spaced apart from each other about the perimeter of the bore 2138a, and are spaced apart from the support roller 2160a. Optionally, as illustrated the alignment rollers 2222a and 2222b and support roller 2160a may be generally equally spaced about the perimeter of the bore 2138a, so that the angles 2228 are all approximately 120 degrees. Alternatively, the alignment rollers 2222a and 2222b and support roller 2160a need not be equally spaced from each other.

Each alignment roller 2222a and 2222b is configured to rollingly contact the tie bar 2124a and exert an alignment force on its respective bearing surface 2226a and 2226b. In the illustrated configuration, when the tie bar 2124a is aligned within the bore 2138a, the left alignment roller 2222a may exert a net rightward lateral force on the tie bar 2124a and the right alignment roller 2222b may exert a net leftward lateral force on the tie bar 2124a. If the alignment rollers 2222a and 2222b are symmetrical about the vertical plane 2178, the lateral forces exerted by the alignment rollers 2222a and 2222b may balance each other so that overall there is no net lateral force exerted on the tie bar by the alignment member 2220a. The net downward force exerted by the alignment member 2220a on the tie bar 2124a, if any, may be balanced by the upward support force 2180 exerted by the support roller 2160a.

In the illustrated example, the alignment rollers 2222a and 2222b are mounted above the horizontal plane 2176 and are configured so that the points of contact between the alignment rollers 2222a and 2222b and the tie bar 2124a are also disposed above the horizontal plane 2178. In this configuration, the alignment rollers 2222a and 2222b are not in a position to exert an upward support force on the tie bar 2124a, and are not in position to support any of the weight of the tie bar 2124a. As they will not be supporting the weight of the tie bar 2124a, optionally the alignment rollers 2222a and 2222b need not be as strong as the support roller 2160a.

The alignment rollers 2222a and 2222b define respective roller thicknesses 2230a and 2230b, and roller diameters 2232a and 2232b, which may be equal to, greater than or less than the thickness 2166 and diameter 2172.

In the illustrated configuration, the rotation axes 2224a and 2224b of the alignment rollers 2222a and 2222b, respectively, are not parallel with each other, with the horizontal plane 2176 or with the roller axis 2174a.

Optionally, the alignment member 2220a may be configured so that the inward most portion of the alignment member 2220a does not extend into or beyond the mold support plane

2190. For example, the roller axes 2224*a* and 2224*b* can be set back from the mold support plane 2190 by a setback distance 2234 that is greater than diameter 2232*a* and 2232*b*. Optionally, if the alignment rollers 2222*a* and 2222*b* are generally identical to support roller 2160*a*, the axes 2224*a* and 2224*b* may be co-planar with roller axis 2174*a* and the setback distance 2234 may be generally equal to setback distance 2192. The axes 2224*a* and 2224*b* may be offset inward from the inner end of bore 2138*a* by a spacing 2236, which, in the example illustrated, is equal to distance 2194.

Alternatively, instead of two spaced apart rollers 2222*a* and 2222*b*, the alignment member 2220*a* may include any other suitable apparatus that can help urge the tie bar 2124*a* into alignment with the bore 2138*a*.

While the support rollers 160, 1160 and 2160 are illustrated as single rollers, the support rollers may include more than one roller or wheel-like member rotatable about the roller axis and positioned beneath the tie bar. For example, instead of a single roller, the support rollers may include two or more laterally spaced apart rollers that are rotatable about a common roller axis and are positionable beneath the tie bar. Providing more than one roller may help accommodate tie bars of different cross-sectional configuration.

In the present examples the tie bars remain fixed to the second or stationary platen while the injection molding machine is in use, and the first platen slides relative to the tie bars. In this configuration, the tie bar engagement apparatuses are provided on the moving platen. Alternatively, an injection molding machine may be configured so that the tie bars are fixed to and translate with the moving platen. In such configurations, there may be relative movement between the tie bars and the stationary platen and the tie bar engagement apparatus may be provided on the stationary platen, or other suitable portion of the machine.

What has been described above has been intended to be illustrative of the invention and non-limiting and it will be understood by persons skilled in the art that other variants and modifications may be made without departing from the scope of the invention as defined in the claims appended hereto.

The invention claimed is:

1. An injection molding machine, comprising:
a) a base and an injection unit mounted to the base;
b) a first platen for holding a first mold section and a second platen for holding a second mold section, the first and second platens supported by the base, at least one of the first and second platens coupled to a platen actuator for moving the at least one platen relative to the other along a machine axis between mold-open and mold-closed positions, the machine axis oriented horizontally and defining a longitudinal direction parallel to the machine axis;
c) at least a first tie bar extending generally between the first and second platens for coupling together the first and second platens when in the mold-closed position, the first tie bar extending in the longitudinal direction along a first tie bar axis, the first tie bar having a fixed end secured to the second platen and a free end spaced longitudinally away from the fixed end, and the first tie bar having a first bearing surface extending longitudinally along an underside surface of the tie bar; and
d) at least a first tie bar engagement apparatus associated with the first tie bar, the first tie bar engagement apparatus including:
a first bore in the first platen for receiving the respective tie bar therethrough at least when the platens are in the mold-closed position; and
a first roller mounted to the first platen proximate the first bore, the first roller comprising a first peripheral surface in rolling engagement with the first tie bar when the first tie bar is received in the first bore to support the first tie bar from beneath, the first roller rotatable about a first roller axis that is oriented horizontally and perpendicular to the machine axis, the first roller axis defining a lateral direction.

2. The machine of claim 1, wherein a vertical alignment plane containing the first bore axis intersects the first peripheral surface of the first roller.

3. The machine of claim 2, wherein the first peripheral surface is generally cylindrical and has a lateral extent that is parallel to the first roller axis, and wherein the lateral extent is laterally centered about the vertical alignment plane containing the first bore axis.

4. The machine of claim 1, wherein the first roller exerts a first support force on the first bearing surface, the first support force directed vertically upwards in lateral alignment with the first tie bar axis.

5. The machine of claim 4, wherein the first bearing surface is disposed in a generally horizontal bearing surface plane and the first support force exerted by the first roller is normal to the bearing surface plane.

6. The machine of claim 5, wherein the first peripheral surface of the first roller is generally cylindrical and provides tangential engagement with the first tie bar longitudinally along a first line of engagement, the first line of engagement in lateral alignment with the first bore axis and at a first elevation below the first bore axis.

7. The machine of claim 1, wherein the first platen comprises a first side facing the second platen, the first side having a first mold support surface disposed in a vertical first support surface plane that is orthogonal to the machine axis, and wherein the first roller is set back from the first support surface plane away from the second platen such that the first peripheral surface is longitudinally shy of the first support surface plane.

8. The machine of claim 7, wherein the first bore has a first end directed towards the second platen, the first end set longitudinally back from the first support surface plane, and wherein the first roller axis is set longitudinally back of the first end of the first bore.

9. The machine of claim 8, wherein the first peripheral surface of the first roller has a first roller radius, and wherein the first roller axis is set back longitudinally from the first support surface plane by a longitudinal offset that is greater than the first roller radius.

10. The machine of claim 1, wherein the first tie bar has a plurality of outwardly protruding tie bar teeth spaced apart longitudinally along at least a portion of the first tie bar, and wherein the first tie bar engagement apparatus includes a locking member adjacent the first bore, the locking member having inwardly directed locking teeth, and the locking member moveable between a locked position in which the locking teeth engage the tie bar teeth to restrict longitudinal movement of the first tie bar relative to the first platen, and an unlocked position in which the locking teeth and tie bar teeth are disengaged and longitudinal movement of the first tie bar relative to the first platen is unrestricted by the locking member.

11. The machine of claim 10, wherein the first bearing surface comprises a first track surface on the first tie bar, the first track surface having first and second lateral sides extending longitudinally along the tie bar, the first and second lateral sides at least partially bounded by portions of the tie bar teeth extending circumferentially away from either side of the first track surface.

12. The machine of claim 11, wherein the first lateral side of the first track surface is at least partially bounded by a first longitudinal row of teeth and the second lateral side of the first track surface is at least partially bounded by a second longitudinal row of teeth.

13. The machine of claim 11, wherein the track surface is integral with the first tie bar.

14. The machine of claim 1, wherein the tie bar engagement apparatus further comprises a second roller mounted to the first platen proximate the first bore, the second roller comprising a second peripheral surface for tangential engagement with the first tie bar along a second line of engagement disposed laterally away from the first bore axis and at a second elevation above the first bore axis, the second peripheral surface in rolling engagement with the first tie bar when the first tie bar is received in the first bore to exert a first laterally inward alignment force and first vertically downward alignment force on the tie bar.

15. The machine of claim 14, wherein the tie bar engagement apparatus further comprises a third roller mounted to the first platen proximate the first bore, the third roller comprising a third peripheral surface for tangential engagement with the first tie bar along a third line of engagement disposed laterally away from the first bore axis opposite the second line of engagement and at an elevation above the first bore axis and generally equal to the second elevation, the third peripheral surface in rolling engagement with the first tie bar when the first tie bar is received in the first bore to exert a second laterally inward alignment force and a second vertically downward alignment force on the tie bar, the second laterally inward alignment force opposite the first laterally inward alignment force.

16. The machine of claim 15, wherein the first roller, second roller and third roller are equally spaced apart from each other about the periphery of the first bore.

17. A method of supporting a plurality of tie bars on an injection molding machine having a pair of platens and a plurality of tie bars extending between the platens, the method comprising:
a) translating the tie bars through respective bores in a first one of the platens while moving at least one of the platens relative to the other between mold-open and mold-closed positions, each bore extending longitudinally along a bore axis; and
b) during at least a portion of the translation of step (a), supporting each tie bar from underneath with a respective roller mounted to the first platen adjacent each respective bore, each respective roller rotatable about a support roller axis that is generally horizontal and disposed vertically below, and in lateral registration with, the bore axis of each respective bore,
wherein each tie bar has a fixed end secured to the second platen and a free end spaced apart from the fixed end, and wherein translating the platens to the mold open position includes withdrawing the tie bars from the bores of the first platen.

18. The method of claim 17, wherein translating the platens from the mold-open position towards the mold-closed position includes moving the free end of each respective tie bar from a roller-disengaged position in which the free end of the tie bar is below vertical alignment with the respective bore, into a roller-engaged position in which the free end of the tie bar is raised into vertical alignment with the respective bore by engagement with the respective roller.

* * * * *